(12) United States Patent
Hopkins et al.

(10) Patent No.: US 6,498,967 B1
(45) Date of Patent: Dec. 24, 2002

(54) TIRE INITIATED VEHICLE CONTROL SYSTEM

(75) Inventors: William Michael Hopkins, Hudson, OH (US); Samuel Patrick Landers, North Canton, OH (US); Stephen F Roth, Port Clinton, OH (US)

(73) Assignee: The Goodyear Tire & Rubber Company, Akton, OH (US)

( * ) Notice: Subject to any disclaimer, the term of this patent is extended or adjusted under 35 U.S.C. 154(b) by 0 days.

(21) Appl. No.: 10/057,128

(22) Filed: Jan. 25, 2002

Related U.S. Application Data

(60) Provisional application No. 60/318,379, filed on Sep. 10, 2001.

(51) Int. Cl.$^7$ ............................................. B60C 23/00
(52) U.S. Cl. ............................. 701/1; 701/36; 702/140; 340/442
(58) Field of Search ................................ 701/1, 36, 37, 701/41, 48, 70, 71, 78; 702/138, 140; 340/438, 442, 443, 444, 447; 303/122.09

(56) References Cited

U.S. PATENT DOCUMENTS

| | | | |
|---|---|---|---|
| 4,536,843 A | 8/1985 | Lambregts | 364/434 |
| 5,934,768 A | * 8/1999 | Miyake | 303/122.09 |
| 6,062,513 A | 5/2000 | Lambregts | 244/175 |
| 6,182,021 B1 | 1/2001 | Izumi et al. | 702/138 |
| 6,230,084 B1 | 5/2001 | Kijima et al. | 701/1 |
| 6,263,282 B1 | 7/2001 | Vallancourt | 701/301 |
| 6,282,478 B1 | 8/2001 | Akita | 701/70 |
| 6,282,498 B1 | 8/2001 | Tamaki et al. | 702/44 |

FOREIGN PATENT DOCUMENTS

| | | | | |
|---|---|---|---|---|
| DE | 100 58 097 A1 | 8/2001 | | B60C/23/06 |
| WO | WO 00/38938 | 7/2000 | | B60C/15/06 |

* cited by examiner

*Primary Examiner*—Richard M. Camby
(74) *Attorney, Agent, or Firm*—David L. King

(57) ABSTRACT

A tire initiated vehicle control system 110 for vehicles 100 is described. The vehicles 100 have vehicle components including a power train 140, a suspension system 180, a steering mechanism 160, a plurality of wheel brake mechanisms 130, one wheel brake mechanism 130 being at each wheel position 104a, 104b, 104c, and 104d location, a fuel or vehicle speed throttle 144 with or without a cruise control system, the vehicle control system 110 has a tire pressure detection device 120 and a control means 200, which preferably has a computer 208 for receiving data from the tire pressure detection device 120. The control means 200 processes the received tire pressure data and upon a preset pressure or rate of change value in tire pressure the control means 208 directs a change in response rates of one or more of the above listed vehicle components.

12 Claims, 5 Drawing Sheets

TIRE INITIATED VEHICLE CONTROL SYSTEM

This application claims the benefit of provisional application No. 60/318,379 filed Sep. 10, 2001.

FIELD OF THE INVENTION

This invention relates to vehicle control systems, more specifically to control systems for automobiles or other vehicles employing pneumatic tires.

BACKGROUND OF THE INVENTION

Advances in technology have enabled vehicles to incorporate computer-controlled features into the operation of the vehicle. Most notably, these features were implemented early on in aircraft and in that technical field the use of "fly by wire systems" or computer-augmented manual control systems has advanced to a fully integrated vertical flight path and speed control system as described in U.S. Pat. No. 4,536,843. The Total Energy Control System (hereinafter referred to as TECS or TEC system) develops fundamental solutions to the problem of coordinated elevator and throttle control to produce performance levels exceeding those generally known in the flight control systems art and is described in U.S. Pat. No. 6,062,513.

Embedded within the TECS are sub systems controlled by TECS including a variety of computer controlled flight systems. Many of these systems automatically react to flight parameters and in various situations these systems sense equipment breakdowns and prevent the pilot from directing the controls in a way that could inadvertently cause a loss of control of the aircraft.

In several aircraft, the reaction of a pilot to equipment failure may overcorrect causing the situation to worsen. The use of computers that have pre-programmed responses to equipment failures insures that the response to a situation is quick and accurate and has been carefully analyzed in test lab conditions to insure a reliable and quick response. The best-experienced pilot may take precious seconds to isolate a problem manually and then he must select from a variety of options and choose the best course of action under a stressful situation.

Historically, airplanes had large amounts of time and usually sufficient airspace and altitude to allow pilots to make optimal choices. Nevertheless, in today's crowded airspace the use of computers to assist the pilots has been widely adapted.

In automobiles, we are just beginning to see applications of computer-controlled systems and equipment-controlled components. Anti-lock brakes, load-leveling suspensions, cruise control and traction control devices are commonly available.

Some car manufacturers are evaluating and testing computer controlled driverless systems. Advertisements show a string of driverless vehicles traveling at highway speeds on a California expressway. While this advanced technology is currently being tested, it is going to be years before fully automatic driverless vehicles are commercially or socially accepted.

Most importantly, the driver in the near term must be able to act and make good choices. Unlike pilots, driver training in simulated adverse conditions is almost non-existent. Driver error due to fatigue, inexperience or bad judgment is the leading cause of accidents.

In U.S. Pat. No. 6,263,282, issued July 2001, a System and Method for Warning of Dangerous Driving Conditions is disclosed. That patent warns a driver when he is closing too fast on a vehicle such that a reduction in speed or a veering or turn is required. This patent basically gives the driver a "heads up" or signal that he should be careful. The driver initiates all action.

In U.S. Pat. No. 6,282,498, a Traveling Direction Correction Apparatus is disclosed. This patent is particularly useful if the driver dozes into a sleep mode and starts to drift out of it's driving lane. This device enable or activates a brake steering sequence to try to keep the car on the pavement while also sounding an alarm to regain the drivers attention. Falling asleep or driver fatigue behind the wheel of an automobile is one of the leading causes of accidents.

In each of the above referenced patents the attempt is to avoid a driver error before the onset of an accident.

Another opportunity for driver error occurs at the initiation of a flat tire. At one time or another most drivers will experience a flat tire while driving. This problem is basically an inconvenience for most drivers in most situations. Other times, particularly at high speed, a sudden loss of pressure in a tire can be very problematic. If the driver reacts quickly by slamming on the brakes, he can lose control or be run into by following or trailing vehicles. If the driver quickly swerves or turns the steering wheel to maneuver to the side of the road he can easily oversteer the vehicle causing a loss of control. Generally the best advice is to hold steady and allow the vehicle to slow by simply removing the foot from the accelerator or by disengaging the cruise control.

After the vehicle has slowed the application of brakes or steering has a less dramatic affect.

While this seems obvious that every driver should understand this simple concept, it is more apparent that the driver often times reacts quicker than he thinks and therefore simply makes a bad situation worse.

Drivers from areas having icy or snowy conditions learn that loss of traction is not corrected by slamming on brakes. Vehicle control is your first objective in such conditions and slowing down is achieved by a deceleration based on removing the foot from the gas pedal. These common sense rules are easy for those who have practiced driving in these conditions. Drivers in warm climates simply do not have as much opportunity to learn these aspects of driving and therefore snowy or slick driving conditions, usually results in higher accident rates when they occur in the warmer climates.

When a tire experiences a flat or a more rapid rate of pressure loss due to a gash, the vehicle suddenly changes in several ways. The load balance on the vehicle shifts as the flattened tire deflates causing the center of mass to actually shift toward the flattened tire. If the brakes are applied the three inflated tires provide the contact patches that try to stop the vehicle. The deflated tire simply cannot apply an equal braking force to the ground compared to the remaining inflated tire. If the rear tire is flat, braking causes the front of the vehicle to nose down as the rear part of the vehicle starts to lift this causes the center of mass to move dynamically forward and off-center. It is as though the four-wheeled vehicle has become a three-wheeled vehicle with a center of mass outside the triangular footprint of the three remaining tires. Needless to say the vehicle suspension is operating in a far from optimal condition. Steering inputs become exaggerated causing an oversteer condition to exist. Braking in combination with steering can exacerbate the problem.

The driver in his best attempts to react may simply make matters worse. In the aircraft industry, trained pilots were found to, in attempts to correct for equipment malfunctions, simply make the wrong choices, this is called "pilot error". Often times what appears to be an appropriate corrective response simply is not in today's sophisticated aircraft. Similarly "driver errors" in flat tire situations occur not so much because the driver failed to do something but precisely because he did react and the actions taken made the situation worse. These problems all seem to be greatly exaggerated at higher speeds.

At very high speeds such as NASCAR racing vehicles where speeds reach 200 mph. Each wheel position has an inner tire called a safety shield. A cut outer tire can occur while the driver decelerates to control the vehicle. These trained drivers have vehicles that created downward forces on the tires and racing suspensions designed very stiff and low to better handle these occurrences.

Advances in run flat tires for passenger tires have minimized the occurrence of rapid loss of tire inflation. Nevertheless the wrong reactions of the driver to low pressure in any pneumatic tire or a sudden loss of air pressure is still an issue. Therefore, recent legislation has mandated tire inflation warning systems been installed in vehicles in some countries, the United States being most notable.

The present invention advances that state of the art form a warning to a more integrated vehicle controlled system that compensate for erroneous driver reactions by either overriding the drivers braking input or steering input or by correcting the input to match the vehicles change in responsiveness due to the loss of pressure in the tire. What makes this invention described hereinafter, truly valuable is the initiation on all vehicle response changes are initiated by a change in the tire condition. When one contemplates the fact that the four tire contact patches formed by the tread touching the roadway initiate all vehicle movements, forward, turning, stopping and ride dampening it is absolutely true that transportation is really enabled and controlled by the tires. It is therefore most logical that the fastest most reliable system or components to feedback information to the vehicle should dictated by the tires. The following description shows very useful application of tire initiated vehicle control.

SUMMARY OF THE INVENTION

A tire initiated vehicle control system for automobile type vehicles having vehicle components including a power train, a steering mechanisms, a plurality of wheel brake mechanisms, one wheel brake mechanism being at each wheel position, four or more pneumatic tires, a fuel or vehicle throttle with or without a cruise control system and a vehicle suspension system is disclosed.

The vehicle control system has a tire pressure detection device for sensing tire pressure of each pneumatic tire and a control means for receiving data from the pressure detection device. The control means processes the received data and upon a preset pressure or rate of change value in tire pressure the control means directs a change in the response rate of one or more of the following vehicle components; the power train, the steering mechanism, the fuel or vehicle speed throttle, or the vehicle suspension system.

At the onset of a loss of air pressure in any of the pneumatic tires as evidenced by the tire pressure detecting device indicating a preset pressure or rate of change in tire pressure has occurred the control means receives a signal, processes the data and directs a change in response rate of one or more of the vehicle components. The changes can include lowering the vehicle suspension at one or more wheel position, shifting the center of mass of the vehicle directly away from the deflated tire, changing the steering response rate thereby lowering the wheel movement relative to steering input to minimize oversteering, disengaging the cruise control mechanism, having the control means take over the fuel or vehicle speed throttle to regulate vehicle speed, initiating "brake steering" programs to the brake mechanisms to maintain a controlled vehicle deceleration.

At the time of the flat tire occurrence, the vehicle control system will have initiated changes in one or more of the response rates and thereby will be bringing the vehicle to a controlled speed or to enable the driver to more safely pull the vehicle over for a tire changeover.

In this fashion driver error input can be minimized preventing over braking input or oversteering input. The fact that the pressure detection device can respond in close to real time means the response rate of the control means directing this changes can occur almost, instantaneously. This feature insure that the driver cannot intervene faster that the control means can initiate overriding controls at least in terms of steering and braking inputs. Some systems such as activating a lowering of the suspension or shifting the weight of the suspension or shifting the weight balance of the vehicle may in fact take additional time due to the pneumatic or hydraulic systems used. However it can be appreciated that such actions are when used in combination with the brake, steering and throttle control with or without a cruise control system and a vehicle suspension system as described is capable of achieving vehicle controls far faster than the typical driver will be able to perceive a low pressure or flat tire condition.

It is believed preferable that the control means include a computer or microprocessor having sufficient memory capable of storing preset algorithms that upon known variable such as vehicle speed and vehicle yaw or lateral cornering forces may dictate certain alternative response rate changes of the various vehicle components that are subjected to control input changes.

Ideally the driver should only be aware that the vehicle has initiated a flat tire mode by an audible or visual signal. Preferably all vehicle system such as steering and braking will be controlled such that over braking and oversteering is not an issue regardless of the drivers input. In this fashion, driver error can be compensated for in a more reliable manner.

The added benefit of this vehicle control system is runflat type tires can be employed more easily due in part to weight shifts and suspension adjustments being made at the time of the flat tire occurrence. Maximum vehicle speeds under such conditions can be controlled by the control means. This insures the tires when operated uninflated will not be overheated. Furthermore the control means can advise how many miles the tire was operated in the uninflated condition. This more reliably would enable the tire to be inspected for structural damage upon repair.

The tire pressure detection device may be internal of the tire using a microprocessor chip for sending a signal to the controller as is taught in Patent Publication WO01/19626. Alternatively the tire pressure detection device may be incorporated into the ABS brake mechanisms as is taught in the DWS systems. In such a case the variation in tire response to the brake system can predictably identify a tire operating at a low pressure and can, based on known parameters, predict when a preset pressure condition has occurred.

Definitions

"Antilock Brakes (ABS)" means any means for preventing the application of a braking input from the driver causing the tires to stop rotating as the vehicle comes to a rapid stop.

"Braking Mechanism" means any mechanical or electrical means for retarding the wheel rotation including but not limited to drum brakes, disk brakes, with or without ABS systems.

"Cruise Control" means any system or device that controls throttle input to the power train to maintain the vehicle at a constant rate of velocity.

"Electronic Suspension Program" means any computer software program used in conjunction with a vehicle's suspension or antilock brakes to adjust vehicle ride performance on demand.

"Fuel or Vehicle Speed Throttle" means the entire system that controls the rate of fuel or power inputted to the power train to increase or decrease vehicle speed including the foot or accelerator pedal associated linkages and supply times for feeding gasoline to the engine's fuel injection or carburetion devices for gasoline burning engines or the similar counterparts for hybrid engines employing fuel cells, or electric motors.

"Pneumatic tire" means a laminated mechanical device of generally toroidal shape (usually an open torus) having beads and a tread and made of rubber, chemicals, fabric and steel or other materials. When mounted on the wheel of a motor vehicle, the tire through its tread provides traction and contains the fluid or gaseous matter, usually air that sustains the vehicle load.

"Tire pressure sensor or detection device" means any system or device capable of measuring the inflation condition of the tires. The measurement can be done directly by monitoring the tires internal pressure condition as occurring or alternatively it can signal when a rate of change in pressure is observed. The measurement can be indirectly achieved wherein changes in torque at the wheel location is measured or changes in radial tire deflection is measured at known speeds and is sensed by any system such as the Antilock brake System. Whether the measurement is direct or indirect the sensing or detection device simply must send a signal to a control means to advise when a measured or predicted tire pressure condition exist evidencing a flat or low pressure in one or more tires.

"Traction Control" means any system designed to adjust for wheel slippage by controlling the drive axle or braking system to achieve a more controllable tire response to the road surface conditions.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments.

Elements of the figures are typically numbered as follows. The most significant digits (hundreds) of the reference number correspond to the figure number. Elements of FIG. 1 are typically numbered in the range of 100–199, elements of FIG. 3–6 are typically numbered in the range of 200–400.

Figure 1:
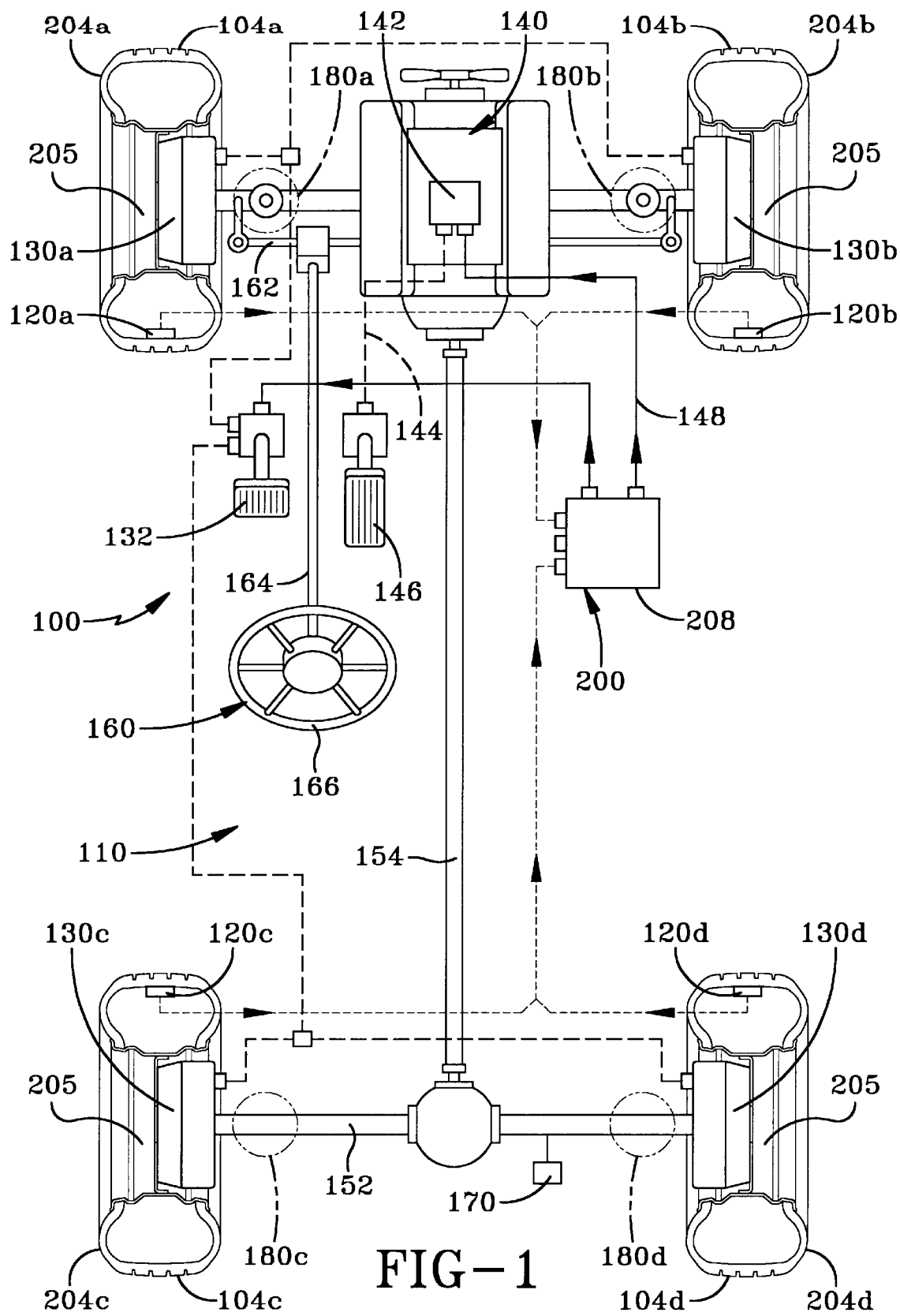
Figure 2:
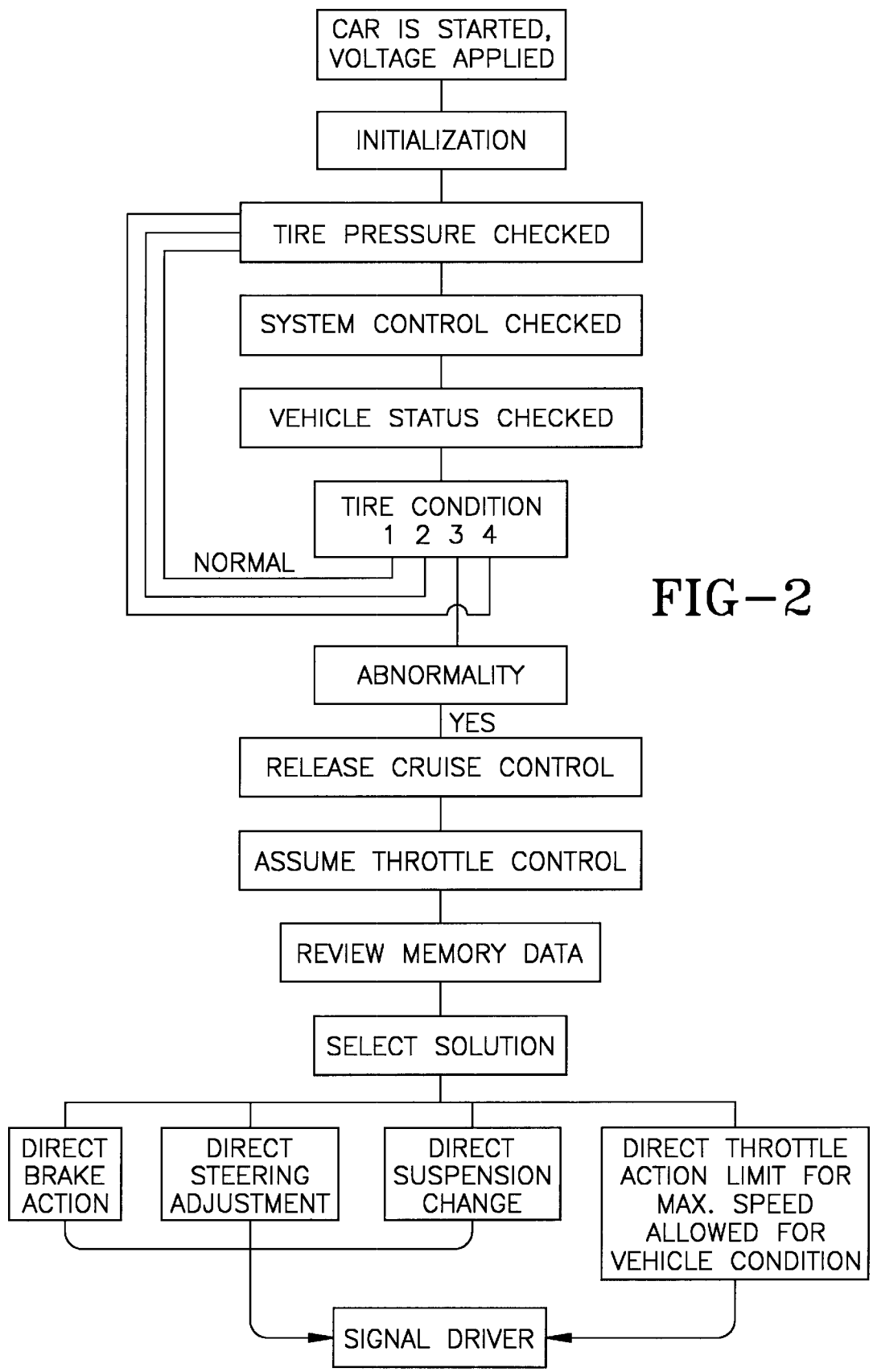
FIG. 2 is a process flow diagram having no reference numerals. Similar elements throughout the drawings may be referred to by similar reference numerals. For example, the element 199 in a figure may be similar, and possibly identical to the element 299 in an other figure. In some cases, similar (including identical) elements may be referred to with similar numbers in a single drawing. For example, each of a plurality of elements 199 may be referred to individually as 199a, 199b, 199c, etc. Such relationships, if any, between similar elements in the same or different figures will become apparent throughout the specification, including, if applicable, in the claims and abstract.

The structure, operation, and advantages of the present preferred embodiment of the invention will become further apparent upon consideration of the following description taken in conjunction with the accompanying drawings, wherein:

FIG. 1 is a simplified diagram of a vehicle having the tire initiated vehicle control system according to the present invention;

FIG. 2 is a process flow diagram.

Figure 3:
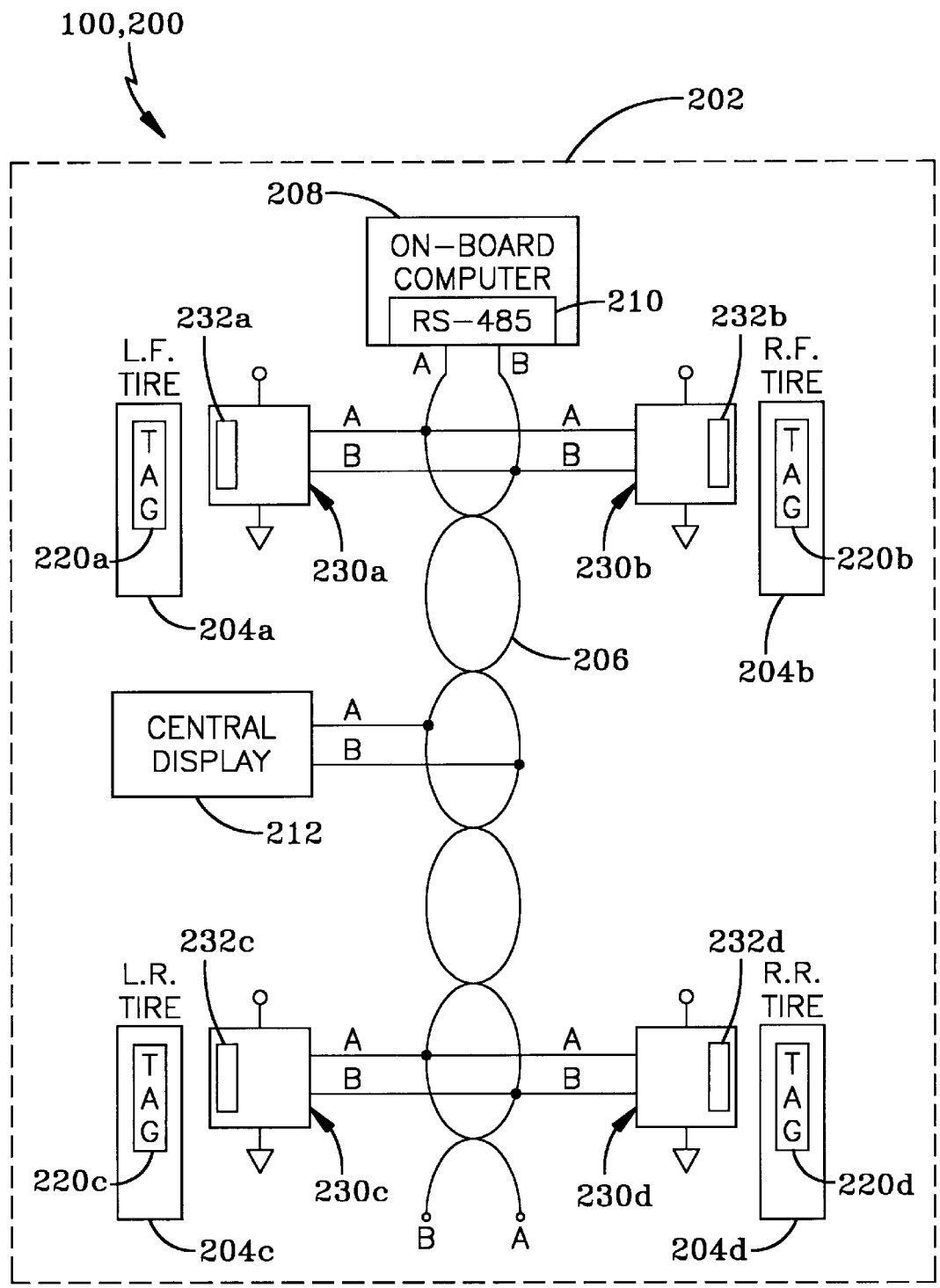
Figure 4:
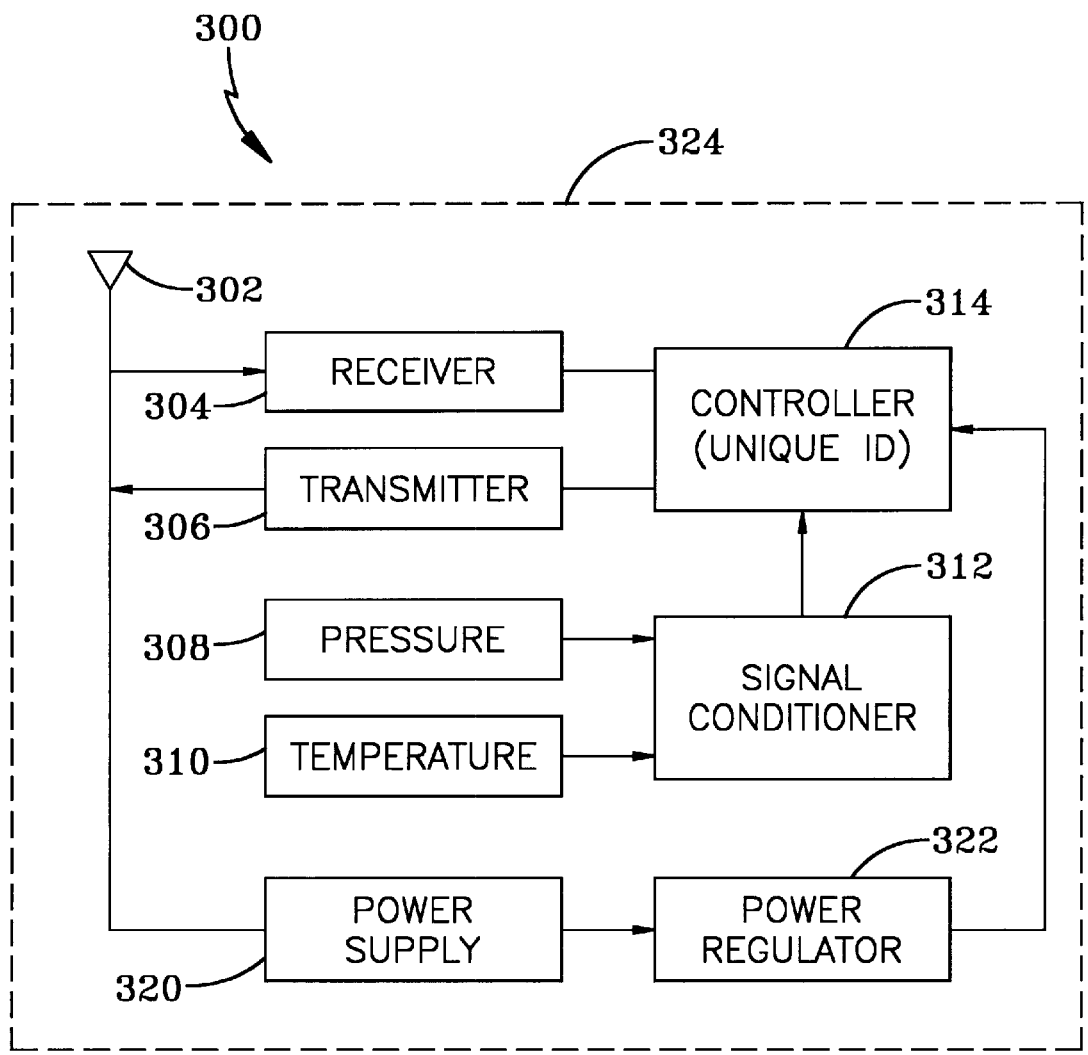
Figure 5:
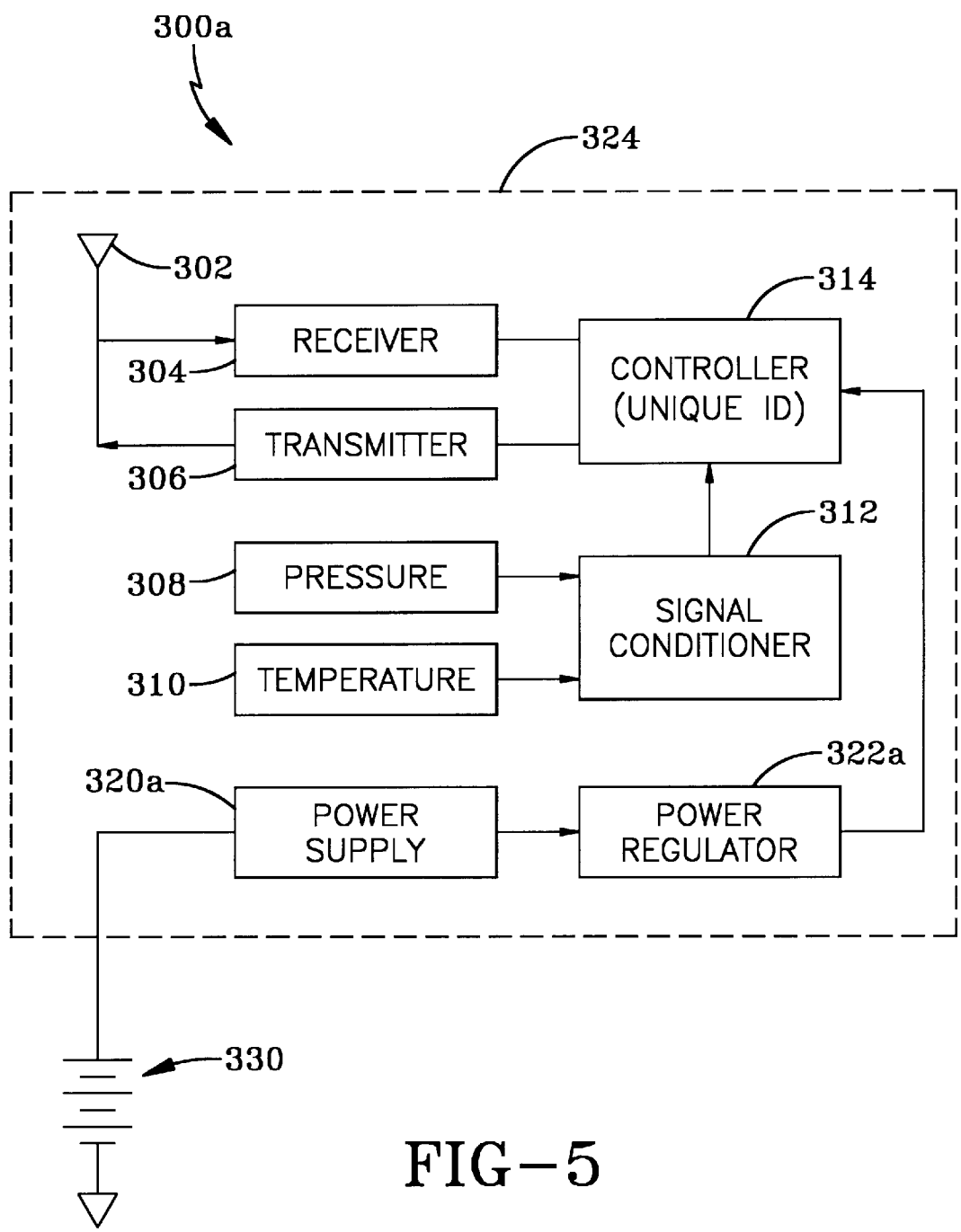

FIG. 3 is a schematic illustration of a multiplexed low pressure warning system (LPWS) installed on a vehicle, according to the invention;

FIG. 4 is a schematic illustration of an exemplary wheel station reader for the LPWS system of FIG. 3, according to the invention;

FIG. 5 is a schematic illustration of an alternate embodiment of an exemplary wheel station reader for the LPWS system of FIG. 3, according to the invention.

DETAILED DESCRIPTION OF THE INVENTION

With reference to FIG. 1, a vehicle 100 is shown. The vehicle employs a tire initiated vehicle control system 110, which in the illustrated embodiment uses a low pressure warning system (LPWS) as an exemplary one possible tire pressure sensing or detection device 120. For purposes of describing the invention this system was chosen only for exemplary purposes other tire pressure sensing or detection devices 120 or other suitable alternatives are possible and contemplated within the scope of the present invention. This description provides a rather complete description of the LPWS system 200 later on.

The vehicle 100 has four wheel position illustrated 104a, 104b, 104c and 104d. Each wheel position includes a tire 204 and a rim 205. A brake mechanism system 130 has four brake mechanisms 130a, 130b, 130c, and 130d at each wheel position. Each brake is connected to the brake pedal 132 as shown.

The vehicle 100 is powered by a power train 140. The power train is preferably a gas powered engine or other suitable engine or motor. As shown, the power train has a fuel injected carburetion system 142 and a fuel throttle or vehicle speed throttle 144 is shown in dashed lines connected to the accelerator pedal 146. Assuming the vehicle speed is controllable automatically with a cruise control system the throttle can be connected to the computer 208 as shown in solid line 148. The power train may drive the front axles 150 or the rear axles 152 or both. As shown a connecting drive shaft 154 is linked to the rear axle.

The front of the vehicle is shown with a steering mechanism 160, the linkages 162 connect each front wheel to a steering rod 164 having a steering wheel 166 connect at the drivers normally seated location.

The vehicle 100 further has a vehicle suspension system 180 having suspension mechanisms as a circular disks 180a, 180b, 180c and 180d at each wheel position. Each suspension mechanism is also connecting to the central computer 208.

In operation each vehicle system including the brake mechanism, the steering mechanisms 140 the tires are connected to the control means 200 (as shown the computer 208). Preferable the fuel throttle 144 and the vehicle cruise control and suspension systems are also connected to the control means.

As shown, the vehicle 100 is a four-wheeled vehicle, the vehicle 100 alternatively could have six wheels 104 as is the case in some light truck vehicles. Also the tire initiated control system 110 may further include a connection trailer hookups 170. In such a case the tire pressure of the trailer could be sensed and transmitted to the vehicle control system 110 to respond to a flat tire on a pulled trailer.

Compatible connecting ports 170 would insure the trailer is being monitored for tire condition and such vehicles could be sold as a towing package option as is currently done for other features on light trucks.

In essence the vehicle 100 will be capable of adjusting automatically to a report or signal that a tire deflation or low tire pressure condition occurs.

It is possible that the system 110 simply acts on a signal independent of the wheel position in such a case the throttle and the brakes 130 could be controlled by the computer 208, more preferably the steering mechanism 160 also should be controlled.

In more sophisticated designs not only would these basic systems be controlled but also the vehicle suspension 180 could be controlled to lower the chassis or stiffen the spring rate or to shift the vehicle center of mass all in an attempt to optimize the vehicle performance to the low or flat tire.

It is contemplated that some vehicles may be equipped with a central air supply that could direct air pressure to or from the tires, thus providing some rapid supplemental air pressure as the vehicle 100 is being slowed from a high-speed condition.

All of these aspects of the invention are possible when the tire condition is sensed and changes in the tire pressure are used to initiate a vehicle signal to alert the computer 208 to react.

Ideally, the sensor 120 should identify which tire position is affected. In that way the control means 200 can select the optimum response based on numerous pre-selected algorithms for each specific possible flat tire condition. Numerous mathematic models can be pre-programmed into the computer 208 that take into account the vehicle speed, the loaded weight of the vehicle, the rate of pressure loss in a tire, the possible condition of multiple tire flats due to road debris etc. The microprocessor will select in an almost instantaneous fashion of the optimum solution and will take direct control of these vehicle systems before the driver can react.

As shown in FIG. 2, a diagram of the flow chart of a flat tire or low tire indication and a control means processing function.

As shown when the vehicle 100 is started voltage is applied and the tire initiated vehicle control system 110 is initialized. The tire pressure sensing 120 is checked as well as the system control means 200 and each of the vehicle systems that are controlled in the event of a flat tire. Once the vehicle status is verified and all systems check out the vehicle 100 can be driven. Each tire 204 is monitored and all systems can be driver controlled as long as the tires report normal status. When a tire 204 reports an abnormality the system 110 takes control. The cruise control if activated is released and the computer reviews the memory bank for solution when the tire 3 fails at the speed indicated as shown, the optimum solution is found and the control means direct brake action, steering response adjustments, and suspension changes, establishes the maximum vehicle speed for the throttle control and then signals the driver with a light on the dashboard, that a flat tire or low pressure tire condition exits.

The assumption of control transfer to the control means 200 should be extremely fast. The driver's first sensation should be a deceleration of the vehicle is occurring. Erroneous driver reaction can be overridden and the vehicle will controllably be slowed to a point where the driver can either stop or if he has runflat tires continue to drive to a repair station while not being able to exceed a maximum speed limit allowed for the vehicle.

FIG. 3 illustrates one embodiment of using Low Pressure Warning System (LPWS) for the control means 200 of the present invention, installed on a vehicle 100 (shown in dashed lines), such as a typical passenger vehicle having four pneumatic tires 204a, 204b, 204c and 204d installed on four respective wheels (not shown).

The vehicle 100 is preferably equipped with an RS-485 (or equivalent) multiplexed serial data bus 206 controlled by an on-board vehicle computer 208 having an RS-485 interface 210. Preferably, a central display unit 212 is connected either directly to the computer 208 or is operatively connected (as shown) to the computer 208 via the data bus 206.

The serial data bus 206 is suitably an 18-gauge twisted pair of insulated wires (labeled "A" and "B"), preferably with a minimum of one twist per inch, with an overall length of less than 40 meters. It is within the scope of the invention that if no data bus is provided on the vehicle, one can be added thereto. For example, in the absence of an existing vehicle data bus, a dedicated data bus may be provided, such as a bi-directional data bus conforming to RS-485 or other suitable serial communications standards.

Each of the four tires 204a . . . 204d is equipped with an electronic module ("TAG") 220a . . . 220d, respectively, and associated sensor (not shown, well known) capable of monitoring one or more conditions such as air pressure and air temperature within the tire, and transmitting a radio frequency (RF) signal indicative of (e.g., modulated as a function of) the monitored condition(s) within the respective vehicle tire. The tags 220a . . . 220d are suitably transponders, but my alternatively simply comprise one or more condition sensors and radio frequency transmitter. The tags 220a . . . 220d are described in greater detail with respect to FIGS. 4 and 5 herein below.

The system 200 comprises four LPWS wheel station readers (monitors) 230a . . . 230d, each associated with a respective one of the tires 204a . . . 204d and located in close proximity therewith, such as mounted within the wheel wells of the vehicle. Each monitor 230a . . . 230d comprises an antenna (not shown, well known) which is attached at a fixed position on the vehicle adjacent the tire, within the near field of the respective tag (220). As mentioned hereinabove, the use of near field transmission has many distance advantages over transmitting over an inherently greater distance from each wheel to a central location on the vehicle.

Each monitor (230) is connected to a source of power (as indicated by the lines terminating in circles and triangles) and is connected to the multiplexed serial data bus 206 for individually communicating with the on-board computer 208. The monitors 230a . . . 230d are described in greater detail with respect of FIG. 6 herein below.

Each monitor 230a . . . 230d is generally comparable to an interrogator of a conventional transponder system in that it comprises and antenna 232a . . . 232d, a receiver transmitting signals (and optionally power) to a respective one of the tags 220a . . . 220d. Each antenna 232a . . . 232d couples with an associated one of the tags 220a . . . 220d, respectively.

It is within the scope of the invention that all components of the monitor (230), including the antenna (232) can be encapsulated in a single package. Alternatively, the antenna (232) can be disposed outside of such a packages. The antenna 232 is suitably a coil of wire on a ferrite rod, such as described in U.S. Pat. Nos. 4,220,907 and 4,319,220.

Each monitor 230a . . . 23d comprises a suitable data transceiver (such as the DS36277 Dominant Mode Multi-point Transceiver by National Semiconductor), discussed in greater detail herein below, to facilitate two-way data transmission via the data bus 206.

In this manner, monitored condition information carried by the RF signals from the respective tags (220) can be decoded (e.g., demodulated) and provided to the on-board computer 208 for subsequent display (212) to the operator of the vehicle. It is within the scope of the invention that suitable discernable visual and/or audible warnings can be used at the option of the vehicle manufacturer.

A monitor's transmissions to the respective tag may comprise a carrier signal for energizing a passive tag, and may comprise signals to "wake up" and active tag which is in a low-power sleep mode.

Monitored conditioned information carried by the RF signals from the respective tags 220a . . . 220d can be decoded (e.g., demodulated) and provided to the on-board computer 208 for subsequent display (212) to the operator of the vehicle 202. It is within the scope of the invention that suitable discernable visual and/or audible warnings can be used at the option of the vehicle manufacturer.

Regarding communication occurring over the serial data bus 206, multiple (MUX) wiring, or networking, is generally well known, and has been introduced in automotive applications to address the increase in complexity and the number of onboard electronic devices in automobiles.

For example, the Society of Automotive Engineers (SAE) has promulgated the J1708 "Recommended Practice" for implementing a bi-directional serial communications link, defining parameters of the serial link that relate primarily to hardware and basic software compatibility such as interface requirements, system protocol, and message format. J1708 is a hardware and basic communications protocol specification. The aforementioned DS36277 is a transceiver based on a standard RS-485 transceiver and optimized for use with J1708. The physical media of the J1708 serial data bus is 18-gauge twisted pair with a minimum of one twist per inch, with a maximum intended length of 40 meters. A follow-up to J1708 is the SAE J1587 Recommended Practice with defines a format for messages and data being communicated over the J1708 data bus. A number of message identification numbers (MIDs) are assigned to transmitter categories, and no two transmitters in the system shall have the same MID. Subsystem identification numbers (SIDs) are assigned, there being a plurality of SIDs definable for each MID. For example, there are a number of engine SIDs, a number of transmission SIDs, etc. A number of parameter identification characters (PID) are assigned. For example, PID "241" is assigned to tire pressure, and PID "242" is assigned to tire temperature.

AN EXEMPLARY TIRE TAG

FIG. 4 is a simplified schematic illustration of an exemplary tag 300 (compare 220a . . . 220d) for use in the system 200 of FIG. 3. The tag 300 is preferably a transponder, and comprises and antenna 302, a receiver 304, a transmitter 306, a pressure sensor 308, a temperature sensor 310, signal conditioning circuity 312, and a micro controller 314 which may preferably have a unique identification (ID) number associated therewith, the aforementioned electronic components being interconnected as shown in the figure.

The tag (transponder) 300 is an electronic device that acquires power to operate, and may be either "active" or "passive". As mentioned hereinabove, "passive" transponders are transponders powered by the energy of a signal received from an external "interrogator" apparatus. "Active" transponders are transponders having their own power supply (e.g., a battery). FIG. 4 illustrates a passive version of the tag 300, wherein a power supply 320 rectifies an RF signal received on the antenna 302 and provides a raw DC signal to a power supply circuit 320 (typically comprising a bridge rectifier and a storage capacitor), which supplies DC current to an optional power regular circuit 322 for powering the other components of the tag 300. The components of the tag 300 are suitably disposed within a package 324 to protect the components. The package 324 is suitably a plastic package within which the components are encapsulated. The antenna 302 is shown as being disposed within the package 234. However, it should be understood that the antenna 302 could be disposed outside of the package 324 including, for example, a loop of wire extending about the circumference of the tire on an inside surface thereof.

FIG. 5 illustrates an active version of the tag 300a (compare 300), wherein a battery 330 provides power to a power supply circuit 320a (compare 220) to a power regulator 322a (compare 322) to power to other components of the tag 300a. The battery 330 is suitably located outside (as shown) of the package 324.

AN EXEMPLARY LPWS MONITOR

As mentioned hereinabove, monitors (230a . . . 230d) are attached to the vehicle and located adjacent to each tire (204a . . . 204d) such that a low-powered radio transmission can take place between the tire and the respective monitor in a controlled manner. The LPWS monitor comprises a transmitter to address the tag within the tire, a receiver to receive pressure (and optionally, temperature) data from the tag (220a. . . 220d) within the tire, and a controller to supervise the sequencing of transmitter/receiver operation and to transmit data received from the tag over the vehicle data bus (106).

An exemplary monitor (compare 230) for use in the system 200 of FIG. 3 with a transponder-type tag such as was described with respect to FIGS. 4 and 5.

The monitor comprises an antenna (compare 232), a receiver for receiving transmissions from the tag, a transmitter for transmitting to the tag, and a controller for controlling the operation of the monitor. The transmissions to the tag may comprise a carrier signal for energizing a passive tag, and may comprise signals to "wake up" an active tag which is in a low-power sleep mode. These, and other components of the monitor are suitably disposed within a package to protect the components. The package is suitably a plastic package within which the components are encapsulated. The antenna is shown as being disposed outside of the package. However, it should be understood that the antenna could be disposed within the package.

The monitor is preferably hard-wired, via a power regular which is preferably contained within the package, to the automobile power (tire initiated vehicle power supply), typically positive 12 volts ("+12 V") and ground ("GND").

The monitor also comprises a data transceiver which is preferably contained within the package. The data transceiver is operatively connected to the controller, as illustrated to facilitate two-way data transmission between the controller and a vehicle data bus (compare 206). The vehicle data bus is suitably bi-directional and conforms to RS-485 communications standards.

As mentioned hereinabove, if no data bus is provided on the vehicle, one can be added thereto. For example, in the absence of an existing vehicle data bus (206), a dedicated data bus may be provided, such as a bi-directional data bus conforming to RS-485 or other suitable serial communications standards.

The data transceiver is suitably a DS36277 Dominant Mode Multipoint Transceiver is designed for use on bi-directional differential busses. It is optimal for use on Interfaces that utilize Society of Automotive Engineers (SAE) J1708 Electrical Standard. The device is similar to standard TIA/EIA-485 transceivers, but differs in enabling scheme. The Driver's Input is normally externally tied LOW, thus providing only two states: Active (LOW), or Disabled (OFF). When the driver is active, the dominant mode is LOW, conversely, when the driver is disabled, the bus is pulled HIGH by external bias resistors. The receiver provides a FAILSAFE feature that guarantees a known output state when the Interface is in the following conditions: Floating Line, Idle Line (no active drivers), and Line Fault Conditions (open or short). The receiver output is HIH for the following conditions: Open Inputs, Terminated Inputs (50 Ohm), or Shorted inputs. FAILSAFE is a highly desirable feature when the transceivers are used with Asynchronous Controllers such as UARTs.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full-intended scope of the invention as defined by the following appended claims.

What is claimed is:

1. A tire initiated vehicle control system for automobile type vehicles having vehicle components including a power train, a steering mechanism, a plurality of wheel brake mechanisms, one wheel brake mechanism at each wheel position, a fuel or vehicle speed throttle with or without a cruise control system, four or more pneumatic tires, and a vehicle suspension system, the vehicle control system comprising:

a tire pressure detection device;

a control means for receiving data from the tire pressure detection device, the control means processes the received data and upon a preset pressure or rate of change value in tire pressure, the control means directs a change in the response rate of one or more of the following vehicle components, the power train, the steering mechanism, the plurality of wheel brake mechanisms, the fuel or vehicle speed throttle or the vehicle suspension system; and wherein a preset pressure or rate of change value causes an activation of the control means to adjust the vehicle suspension causing a lowering of the vehicle.

2. The tire initiated vehicle control system of claim 1 wherein the control means at a preset pressure additionally directs a change in the response rate in one or more following vehicle components, the power train, the steering mechanism, the plurality of wheel brake mechanism or the vehicle suspension.

3. The tire initiated vehicle control system of claim 1 wherein the control means at a preset pressure additionally directs a change in the response rate in one or more following vehicle components, the power train, the steering mechanism, the plurality of wheel brake mechanism or the vehicle suspension.

4. A tire initiated vehicle control system for automobile type vehicles having vehicle components including a power train, a steering mechanism, a plurality of wheel brake mechanisms, one wheel brake mechanism at each wheel position, a fuel or vehicle speed throttle with or without a cruise control system, four or more pneumatic tires, and a vehicle suspension system, the vehicle control system comprising:

a tire pressure detection device;

a control means for receiving data from the tire pressure detection device, the control means processes the received data and upon a preset pressure or rate of change value in tire pressure, the control means directs a change in the response rate of one or more of the following vehicle components, the power train, the steering mechanism, the plurality of wheel brake mechanisms, the fuel or vehicle speed throttle or the vehicle suspension system; and wherein a present pressure or rate of change value causes activation of the control means to adjust the vehicle weight balance shifting the mass center directly away from the wheel position signaling the preset pressure or rate of change value has been triggered.

5. A tire initiated vehicle control system for automobile type vehicles having vehicle components including a power train, a steering mechanism, a plurality of wheel brake mechanisms, one wheel brake mechanism at each wheel position, a fuel or vehicle speed throttle with or without a cruise control system, four or more pneumatic tires, and a vehicle suspension system, the vehicle control system comprising:

a tire pressure detection device;

a control means for receiving data from the tire pressure detection device, the control means processes the received data and upon a preset pressure or rate of change value in tire pressure, the control means directs a change in the response rate of one or more of the following vehicle components, the power train, the steering mechanism, the plurality of wheel brake mechanisms, the fuel or vehicle speed throttle or the vehicle suspension system; and wherein a present pressure or rate of change value causes activation of the control means to adjust the steering mechanism response rate lowering the wheel movement inversely proportional to steering input.

6. The tire initiated vehicle control system of claim 5 wherein the wheel turning movement is reduced relative to steering input in a negative linear slope relationship relative to vehicle speed (v), the faster the speed (v) the lower the wheel turning movement for a given steering input.

7. A tire initiated vehicle control system for automobile type vehicles having vehicle components including a power train, a steering mechanism, a plurality of wheel brake mechanisms, one wheel brake mechanism at each wheel position, a fuel or vehicle speed throttle with or without a cruise control system, four or more pneumatic tires, and a vehicle suspension system, the vehicle control system comprising:

a tire pressure detection device;

a control means for receiving data from the tire pressure detection device, the control means processes the received data and upon a preset pressure or rate of change value in tire pressure, the control means directs a change in the response rate of one or more of the following vehicle components, the power train, the steering mechanism, the plurality of wheel brake mechanisms, the fuel or vehicle speed throttle or the vehicle suspension system; and wherein a preset pressure or rate of change value causes an activation of the control means to disengage the cruise control system.

8. A tire initiated vehicle control system for automobile type vehicles having vehicle components including a power train, a steering mechanism, a plurality of wheel brake mechanisms, one wheel brake mechanism at each wheel position, a fuel or vehicle speed throttle with or without a cruise control system, four or more pneumatic tires, and a vehicle suspension system, the vehicle control system comprising:

a tire pressure detection device;

a control means for receiving data from the tire pressure detection device, the control means processes the received data and upon a preset pressure or rate of change value in tire pressure, the control means directs a change in the response rate of one or more of the following vehicle components, the power train, the steering mechanism, the plurality of wheel brake mechanisms, the fuel or vehicle speed throttle or the vehicle suspension system; and wherein a preset pressure or a rate of change value causes an activation of the control means to take over the fuel throttle input to the power train.

9. The tire initiated vehicle control system of claim 8 wherein the control means sets the maximum vehicle speed of the vehicle after a preset pressure or rate of change value is achieved.

10. The tire initiated vehicle control system of claim 4 wherein the control means at a preset pressure additionally directs a change in the response rate in one or more following vehicle components, the power train, the steering mechanism, the plurality of wheel brake mechanism or the vehicle suspension.

11. The tire initiated vehicle control system of claim 5 wherein the control means at a preset pressure additionally directs a change in the response rate in one or more following vehicle components, the power train, the steering mechanism, the plurality of wheel brake mechanism or the vehicle suspension.

12. The tire initiated vehicle control system of claim 7 wherein the control means at a preset pressure additionally directs a change in the response rate in one or more following vehicle components, the power train, the steering mechanism, the plurality of wheel brake mechanism or the vehicle suspension.

* * * * *